United States Patent
Reynolds

(10) Patent No.: US 7,085,922 B2
(45) Date of Patent: Aug. 1, 2006

(54) AUTOMATICALLY OVERCOMING FAILED BOOT ATTEMPTS TO FLASH MEDIA

(75) Inventor: Eddy M. Reynolds, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 349 days.

(21) Appl. No.: 10/769,600

(22) Filed: Jan. 30, 2004

(65) Prior Publication Data
US 2005/0172114 A1    Aug. 4, 2005

(51) Int. Cl.
G06F 9/445    (2006.01)
G06F 9/24     (2006.01)

(52) U.S. Cl. .............................. 713/2; 713/1
(58) Field of Classification Search ............. 713/1, 713/2
See application file for complete search history.

(56) References Cited

U.S. PATENT DOCUMENTS 5,822,582 A * 10/1998 Doragh et al. ............ 713/2
6,862,681 B1 * 3/2005 Cheston et al. ........... 713/2
2004/0078679 A1 * 4/2004 Cagle et al. .............. 714/36

* cited by examiner

Primary Examiner—John R. Cottingham
Assistant Examiner—Stefan Stoynov
(74) Attorney, Agent, or Firm—Kevin M. Hart

(57) ABSTRACT

In a computer system according to a preferred embodiment of the invention, failed boot attempts to flash media are automatically detected and overcome without halting the system or requiring user input. The INT 19h handler is modified such that, when the BIOS is attempting to boot to a flash device, the normal INT 10h handler is replaced with a temporary INT 10h handler. The temporary INT 10h handler checks whether characters written to the screen constitute all or a unique part of an error message that would result from a failed boot attempt. If so, then the original INT 10h handler address is restored, and the BIOS jumps to attempt booting from the next bootable device without halting the system. If not, then the BIOS assumes the boot attempt to the flash device was successful, and simply restores the original INT 10h handler address.

6 Claims, 2 Drawing Sheets

```
1    INT 19h handler:
2    ...
3       if(booting to a flash device){
4          temp=current INT 10h handler address;
5          INT 10h address=temp INT 10h handler address;
6          create bufferArray for storing chars written by INT 10h;
7          create magicPhrase array containing error message;
8       }
9    ...
```

FIG. 3

```
1    temp INT 10h handler:
2    ...
3       switch(called_function){
4       ...
5         case 0Eh:
6            successfulBootFlag=0;
7            append char from AL to bufferArray;
8            i=length(bufferArray);
9            if(bufferArray[i-1] !=magicPhrase[i-1]){
10              successfulBootFlag=1;
11           }
12           if(i==length(magicPhrase) || successfulBootFlag){
13              int 10h handler address=temp;
14              if(successfulBootFlag==0){
15                 jump to attempt on next bootable device;
16              }
17           }
18           jump to normal implementation of 0Eh function;
19           break;
20        ...
21       }
22    ...
```

FIG. 4

AUTOMATICALLY OVERCOMING FAILED BOOT ATTEMPTS TO FLASH MEDIA

FIELD OF THE INVENTION

This invention relates generally to computer system programming, and more particularly for BIOS programming.

BACKGROUND

Before the concept of booting to flash media, devices such as compact flash cards, multi-media cards and secure digital cards were intended for use only in digital cameras, printers, MP3 players and the like. Nevertheless, manufacturers of these types of media have always formatted each unit with a DOS master boot record including a partition table designating an active partition. Because of this, at boot time, basic input-output services ("BIOS") firmware believes that the flash media is bootable and attempts to boot to the media. But if no system files are present on the media, the boot attempt fails, and the system is halted with an error message to the user such as "operating system not found."

SUMMARY OF THE INVENTION

In a computer system according to a preferred embodiment of the invention, failed boot attempts to flash media are automatically detected and overcome without halting the system or requiring user input.

In one aspect, modifications are made to the interrupt ("INT") 19h handler and the INT 10h handler in the BIOS. (The INT 19h handler is the bootstrap loader, and the INT 10h handler's 0Eh function is the service normally used to write messages to the screen during booting.) The INT 19h handler is modified such that, when the BIOS is attempting to boot to a flash device, the normal INT 10h handler is replaced with a temporary INT 10h handler. The INT 10h handler is modified such that it checks whether characters written to the screen constitute all or a unique part of an error message that would result from a failed boot attempt. If so, then the original INT 10h handler address is restored, and the BIOS jumps to attempt booting from the next bootable device without halting the system. If not, then the BIOS assumes the boot attempt to the flash device was successful, and simply restores the original INT 10h handler address.

BRIEF DESCRIPTION OF THE DRAWINGS

FIG. 3 is a pseudo-code listing illustrating a preferred method for implementing the flow diagram of FIG. 1.

FIG. 4 is a pseudo-code listing illustrating a preferred method for implementing the flow diagram of FIG. 2.

DETAILED DESCRIPTION OF THE PREFERRED EMBODIMENTS

Figure 1:
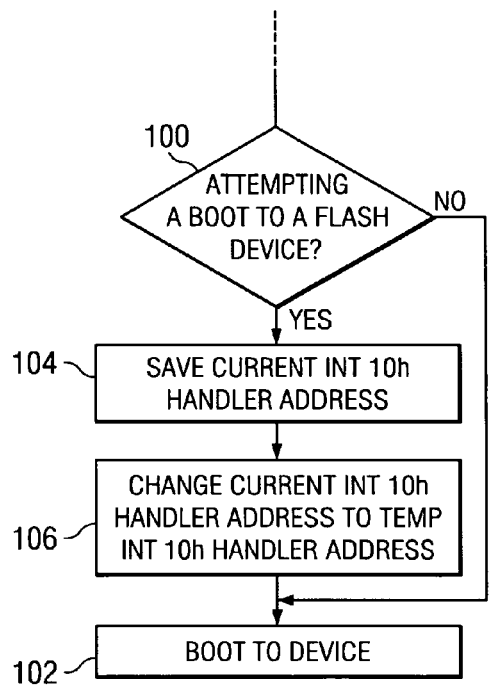
FIG. 1 is a flow diagram illustrating a modification to an INT 19h handler according to a preferred embodiment of the invention.

FIG. 1 illustrates a modification to the INT 19h handler according to a preferred embodiment of the invention. During the servicing of an INT 19h, the modified INT 19h handler determines at step 100 whether the current BIOS boot attempt is directed to a flash memory device. If not, then the BIOS simply attempts to boot from the target device at step 102 as it normally would. But if so, the BIOS saves in step 104 the current INT 10h handler address found in the interrupt vector table. In step 106, the BIOS changes the INT 10h handler address in the interrupt vector table so that it points to a temporary INT 10h handler. This technique is commonly known as "hooking the interrupt."

Figure 2:
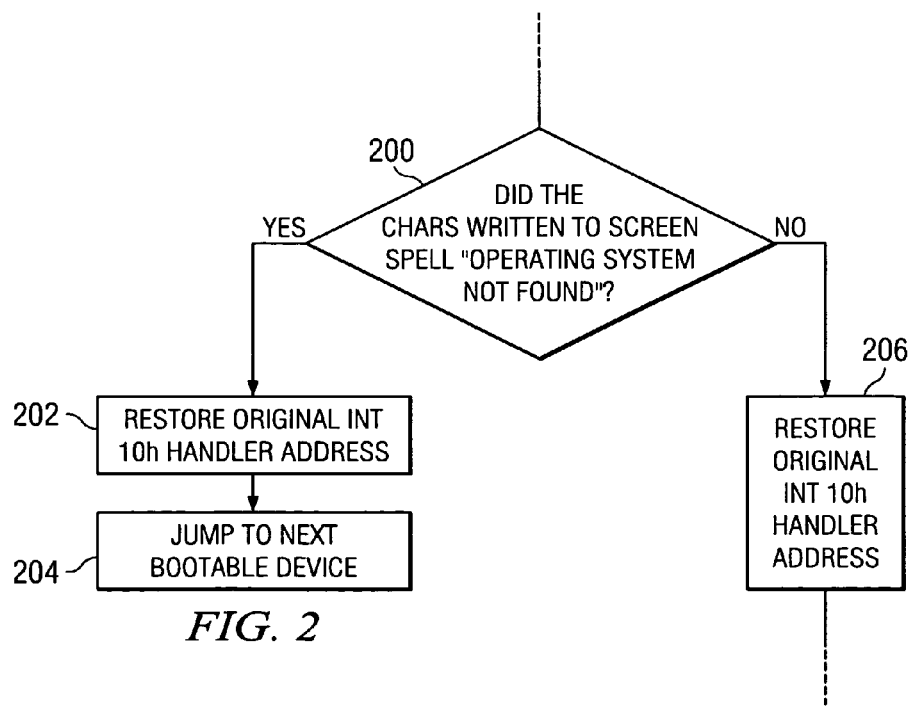
FIG. 2 is a flow diagram illustrating a modification to an INT 10h handler according to a preferred embodiment of the invention.

The temporary INT 10h handler may be just like a traditional INT 10h handler, but with the modifications illustrated in FIG. 2. Referring now to FIG. 2, the modified INT 10h handler determines in step 200 whether the characters written to an output device (such as the screen when INT 10h function 0Eh is invoked) constitute all or a unique part of an error message that would result from a failed boot attempt. For example, a unique part of one such message could be "operating system not found." Other similar error messages are possible. If it is determined in step 200 that all or a unique part of the error message was indeed written, then the BIOS restores the original INT 10h handler address to the interrupt vector table in step 202, and in step 204 jumps to attempt a boot from the next bootable device in the boot sequence. But if it is determined in step 200 that no unique part of such an error message was written, then the BIOS assumes the boot attempt was successful and simply restores, in step 206, the original INT 10h handler address in the interrupt vector table.

The inventive method as described herein above may be implemented in a variety of ways. One such way is illustrated by the pseudo-code listings of FIGS. 3–4. FIG. 3 represents pseudo-code for the modified INT 19h handler of FIG. 1. At line 1, the INT 19h handler is invoked. The ellipses at lines 2 and 9 indicate that, in all other respects, the INT 19h handler according to the invention behaves in the same manner as a traditional INT 19h handler. But, an INT 19h handler according to the invention determines (line 3) whether the BIOS is attempting to boot to a flash memory device. If so, the BIOS hooks INT 10h in lines 4–5, and creates two arrays in lines 6–7. The bufferArray is for storing characters written to the screen by calls to INT 10h function 0Eh. The magicPhrase array should contain a copy of the text of all or a unique portion of the error message the BIOS is trying to catch (such as "operating system not found").

FIG. 4 represents pseudo-code for the modified INT 10h handler of FIG. 2. At line 1, the temporary INT 10h handler is invoked. The ellipses at lines 2, 4, 20 and 22 indicate that, in all other respects, the temporary INT 10h handler behaves in the same manner as a traditional INT 10h handler. But, when servicing a function 0Eh call (line 5), the modified handler also determines whether characters written to the screen since the temporary handler was put in place have matched the contents of the magicPhrase array, and takes the appropriate actions in response to the check. Specifically, each time function 0Eh is performed: a successfulBootFlag is cleared (line 6); the character to be written to the screen is appended to the bufferArray (line 7); and this character is compared with the character in the corresponding position of the magicPhrase array (lines 8–9). If the characters do not match, then it is assumed that the expected error message was not written, and the successfulBootFlag is set to 1 (line 10). Next, if either the length of the bufferArray equals that of the magicPhrase array or the successfulBootFlag equals 1 (line 12): the original INT 10h handler address is restored in the interrupt vector table (line 13); and if the successfulBootFlag equals 0 the BIOS jumps to attempt a boot from the next bootable device in the boot sequence (line 15). Otherwise, the BIOS simply executes the 0Eh function request (line 18).

What is claimed is:

1. A BIOS method for overcoming failed boot attempts to flash media, comprising:

in an INT 19h handler, determining whether the BIOS is attempting to boot from a flash device and, if so, replacing an original INT 10h handler address in a vector table with a temporary INT 10h handler address; and in the temporary INT 10h handler, determining whether a message written to an output device constitutes all or a unique part of an error message that would result from a failed boot attempt; and if so, restoring the original INT 10h handler address in the vector table and jumping to attempt a boot from a next bootable device; but if not, simply restoring the original INT 10h handler address in the vector table.

2. The method of claim 1:

wherein the error message is "operating system not found".

3. Program code embodied in a storage medium that, when executed by a computer, causes the computer to perform a method for overcoming failed boot attempts to flash media, the method comprising:

in an INT 19h handler, determining whether the BIOS is attempting to boot from a flash device and, if so, replacing an original INT 10h handler address in a vector table with a temporary INT 10h handler address; and in the temporary INT 10h handler, determining whether a message written to an output device constitutes all or a unique part of an error message that would result from a failed boot attempt; and if so, restoring the original INT 10h handler address in the vector table and jumping to attempt a boot from a next bootable device; but if not, simply restoring the original INT 10h handler address in the vector table.

4. The program code of claim 3:

wherein the error message is "operating system not found".

5. A computer system configured to perform a method for overcoming failed boot attempts to flash media, the method comprising:

in an INT 19h handler, determining whether the BIOS is attempting to boot from a flash device and, if so, replacing an original INT 10h handler address in a vector table with a temporary INT 10h handler address; and in the temporary INT 10h handler, determining whether a message written to an output device constitutes all or a unique part of an error message that would result from a failed boot attempt; and if so, restoring the original INT 10h handler address in the vector table and jumping to attempt a boot from a next bootable device; but if not, simply restoring the original INT 10h handler address in the vector table.

6. The computer system of claim 5:

wherein the error message is "operating system not found".

\* \* \* \* \*